United States Patent
Yuyama et al.

(10) Patent No.: US 10,523,133 B2
(45) Date of Patent: Dec. 31, 2019

(54) VEHICULAR MOTOR CONTROL DEVICE AND VEHICULAR MOTOR CONTROL METHOD

(71) Applicant: Mitsubishi Electric Corporation, Tokyo (JP)

(72) Inventors: Atsushi Yuyama, Tokyo (JP); Takuto Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/763,989

(22) PCT Filed: Nov. 4, 2015

(86) PCT No.: PCT/JP2015/081017
§ 371 (c)(1),
(2) Date: Mar. 28, 2018

(87) PCT Pub. No.: WO2017/077596
PCT Pub. Date: May 11, 2017

(65) Prior Publication Data
US 2018/0323707 A1 Nov. 8, 2018

(51) Int. Cl.
*H02M 7/538* (2007.01)
*H02M 7/5387* (2007.01)
(Continued)

(52) U.S. Cl.
CPC ......... *H02M 7/5387* (2013.01); *H02M 7/493* (2013.01); *H02M 7/53875* (2013.01);
(Continued)

(58) Field of Classification Search
CPC ............... H02M 7/493; H02M 7/5387; H02M 7/53875; H02M 2007/53876;
(Continued)

(56) References Cited

U.S. PATENT DOCUMENTS

2007/0278986 A1* 12/2007 Okamura ............... B60K 6/365
318/798
2007/0290633 A1* 12/2007 Atarashi ............... B60L 3/0023
318/66
(Continued)

FOREIGN PATENT DOCUMENTS

JP 2006-325373 A 11/2006
JP 2009-055676 A 3/2009
(Continued)

OTHER PUBLICATIONS

International Search Report for PCT/JP2015/081017 dated Feb. 2, 2016 [PCT/ISA/210].

*Primary Examiner* — Fred E Finch, III
*Assistant Examiner* — Rafael O. De León Domenech
(74) *Attorney, Agent, or Firm* — Sughrue Mion, PLLC; Richard C. Turner

(57) ABSTRACT

Provided is a motor control device for a vehicle including: an inverter, in which a plurality of power semiconductor devices are installed, and which is configured to drive a motor through switching control; and a DC/DC converter configured to step up an output voltage of a DC power supply in accordance with a voltage command value to apply the stepped-up voltage to the inverter, in which the inverter employs a wide bandgap semiconductor, for example, a SiC device, as the power semiconductor devices, and the DC/DC converter has a circuit configuration in which a stepwise output voltage is generated at the time of DC/DC power conversion.

12 Claims, 8 Drawing Sheets

(51) Int. Cl.
*H02P 27/06* (2006.01)
*H02M 7/493* (2007.01)

(52) U.S. Cl.
CPC ... *H02P 27/06* (2013.01); *H02M 2007/53876* (2013.01); *H02P 2201/07* (2013.01); *H02P 2201/09* (2013.01)

(58) Field of Classification Search
CPC .. H02P 2201/07; H02P 2201/09; H02P 27/06; H02P 29/024
See application file for complete search history.

(56) References Cited

U.S. PATENT DOCUMENTS

| | | | |
|---|---|---|---|
| 2008/0143281 A1* | 6/2008 | Yaguchi | B60L 15/025 318/139 |
| 2009/0248229 A1* | 10/2009 | Okamura | B60L 50/50 701/22 |
| 2011/0141779 A1 | 6/2011 | Joseph | |
| 2012/0163046 A1 | 6/2012 | Hibino | |
| 2012/0236615 A1* | 9/2012 | Kitabatake | H01L 27/088 363/131 |
| 2013/0134786 A1* | 5/2013 | Ishigaki | H02M 3/158 307/71 |
| 2014/0139156 A1* | 5/2014 | Hayashi | H02P 21/02 318/400.3 |
| 2014/0145694 A1 | 5/2014 | Ishigaki et al. | |
| 2015/0108929 A1 | 4/2015 | Nobe et al. | |
| 2016/0190972 A1* | 6/2016 | Mori | H02M 7/53873 318/490 |

FOREIGN PATENT DOCUMENTS

| | | |
|---|---|---|
| JP | 2011-024377 A | 2/2011 |
| JP | 2011-091992 A | 5/2011 |
| JP | 5044065 B2 | 10/2012 |
| JP | 5109290 B2 | 12/2012 |
| JP | 2013-013234 A | 1/2013 |
| JP | 2015-080343 A | 4/2015 |

* cited by examiner

VEHICULAR MOTOR CONTROL DEVICE AND VEHICULAR MOTOR CONTROL METHOD

CROSS REFERENCE TO RELATED APPLICATIONS

This application is a National Stage of International Application No. PCT/JP2015/081017 filed Nov. 4, 2015.

TECHNICAL FIELD

The present invention relates to a motor control device for a vehicle and a motor control method for a vehicle, which achieve both improvement in fuel efficiency/electricity efficiency and downsizing of the motor control device for a vehicle.

BACKGROUND ART

In recent years, motor vehicles having an electric power train installed therein, for example, hybrid vehicles (hereinafter referred to as "HEV") and plug-in hybrid vehicles (hereinafter referred to as "PHEV") have been widespread. In each of those vehicles, a motor configured to propel the vehicle and an inverter and a step-up DC/DC converter, which are configured to drive the motor, are additionally installed in a configuration of a related-art gasoline engine vehicle. With this configuration, technological development for improving fuel efficiency and electricity efficiency is in progress.

As means for improving the fuel efficiency and the electricity efficiency, there is a method involving controlling an output voltage of the step-up DC/DC converter so as to minimize a total loss of a motor loss, an inverter loss, and a step-up DC/DC converter loss (for example, refer to Patent Literature 1).

Moreover, independently of the technological development for improving the fuel efficiency and the electricity efficiency, technological development for unifying platforms of the HEV/PHEV and the gasoline engine vehicle is in progress in order to decrease the vehicle prices of the HEV and the PHEV. In order to unify the platforms, it is indispensable to downsize the motor, the inverter, the step-up DC/DC converter, and the like, which are components added to the gasoline engine vehicle.

CITATION LIST

Patent Literature

[PTL 1] JP 5109290 B2

SUMMARY OF INVENTION

Technical Problem

However, the related art has the following problems.

As described above, the technology described in Patent Literature 1 is a technology of controlling the output voltage of the step-up DC/DC converter so that the output voltage reaches a voltage at which the total loss of the motor loss, the inverter loss, and the step-up DC/DC converter loss is minimized. On this occasion, in particular, the inverter loss exhibited when a Si device is used for a power semiconductor device increases in proportion to the output voltage of the step-up DC/DC converter, and a gradient of this inverter loss tends to be larger than those of other losses.

Therefore, in order to improve the fuel efficiency and the electricity efficiency, it is required to finely set the output voltage of the step-up DC/DC converter in accordance with a travel state of the vehicle. In other words, it is essential to employ the circuit type of the step-up DC/DC converter whose output voltage can be finely set in this way.

Moreover, in Patent Literature 1, the chopper type is employed as a circuit type of the step-up DC/DC converter. However, when the chopper type is employed, there arises a problem in that the sizes of components, for example, a reactor in particular, increase.

The present invention has been made in view of the above-mentioned problems, and therefore has an object to provide a motor control device for a vehicle and a motor control method for a vehicle, which are capable of achieving both improvement in fuel efficiency/electricity efficiency and downsizing of the motor control device for a vehicle without a loss in vehicle output.

Solution to Problem

According to one embodiment of the present invention, there is provided a motor control device for a vehicle including: an inverter, in which a plurality of power semiconductor devices are installed, and which is configured to drive a motor through switching-control of the plurality of power semiconductor devices; and a DC/DC converter, which is configured to carry out DC/DC power conversion of stepping up an input voltage, which is a DC voltage, in accordance with a voltage command value, to thereby generate an output voltage to be applied to the inverter, in which: each of the plurality of power semiconductor devices installed in the inverter is formed of a wide bandgap semiconductor; and the DC/DC converter has a circuit configuration in which the output voltage is generated as a stepwise output value obtained by stepping up the input voltage to an integer multiple of the input voltage.

Further, according to one embodiment of the present invention, there is provided a motor control method for a vehicle, which is carried out in a motor control device for a vehicle, the motor control device for a vehicle including: an inverter, in which a plurality of power semiconductor devices are installed, and which is configured to drive a motor through switching-control of the plurality of power semiconductor devices; a DC/DC converter, which has a circuit configuration in which DC/DC power conversion of stepping up an input voltage, which is a DC voltage, in accordance with a voltage command value is carried out, to thereby generate an output voltage to be applied to the inverter as a stepwise output value; a voltage sensor, which is configured to measure each of the input voltage and the output voltage; and a controller, which is configured to read as input information the input voltage and the output voltage, which are detected by the voltage sensor, and a torque command value to calculate the voltage command value based on the input information, the motor control method for a vehicle, which is carried out by the controller including: a first step of generating the voltage command value based on the input information so that the output voltage is generated by the DC/DC converter as the stepwise output value obtained by stepping up the input voltage to an integer multiple of the input voltage; a second step of estimating a loss of the motor for each of a plurality of voltage command values, which is able to be output in the first step; a third step of estimating a loss of the inverter for each of the plurality of voltage command values; a fourth step of estimating a loss of the DC/DC converter for each of the plurality of voltage command values; and a fifth step of calculating a total loss, which is a sum of the respective losses for each of the plurality of voltage command values, from respective estimation results obtained in the second step, the third step, and the fourth step, identifying a voltage command value that minimizes the total loss, and outputting the identified voltage command value to the DC/DC converter.

Advantageous Effects of Invention

According to the present invention, the wide bandgap semiconductor, for example, SiC, which is smaller in the change of loss depending on the voltage than the related-art Si device, is applied to the power semiconductor devices for the inverter configured to drive the motor, and the output voltage is appropriately set by the step-up DC/DC converter of a circuit type configured to step up the DC power supply voltage of a battery or the like to an integer multiple thereof. As a result, it is possible to provide the motor control device for a vehicle and the motor control method for a vehicle, which are capable of achieving both the improvement in the fuel efficiency/electricity efficiency and the downsizing of the motor control device for a vehicle without a loss in the vehicle output.

DESCRIPTION OF EMBODIMENTS

Now, a motor control device for a vehicle according to each embodiment of the present invention is described with reference to the accompanying drawings.

First Embodiment

Figure 1:
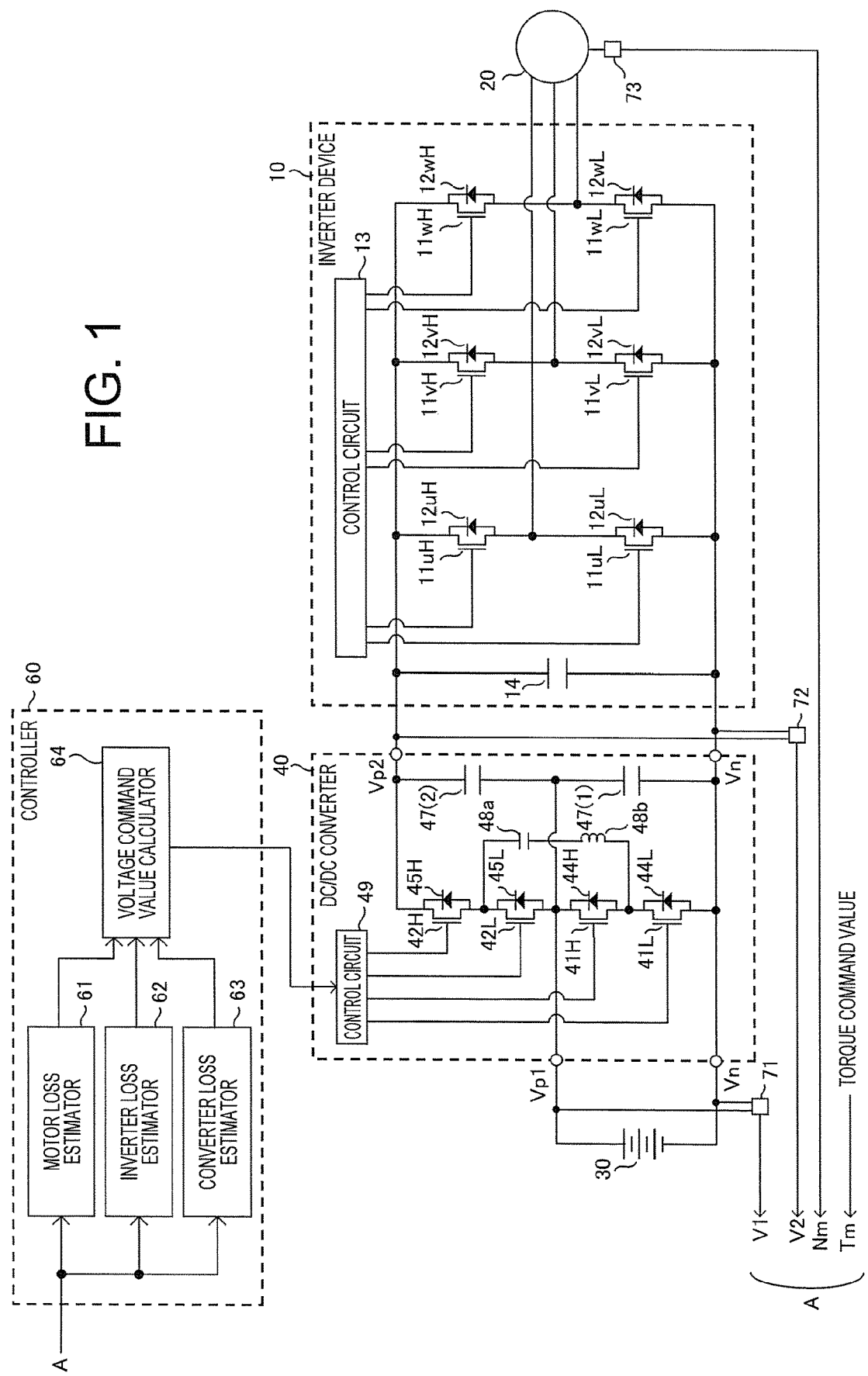
FIG. 1 is a configuration diagram of a motor control device for a vehicle according to a first embodiment of the present invention.

FIG. 1 is a configuration diagram of a motor control device for a vehicle according to a first embodiment of the present invention. The motor control device for a vehicle according to the first embodiment includes an inverter device 10, a power-running/regeneration motor 20, an electricity storage device 30, a DC/DC converter 40, a controller 60, voltage sensors 71 and 72, and a revolution number sensor 73.

The power-running/regeneration motor 20 is, for example, a permanent magnet AC synchronous motor. Moreover, the electricity storage device 30 is chargeable and dischargeable, and is, for example, a lithium ion battery, a nickel hydrogen battery, or an electric double layer capacitor. Further, the inverter device 10 is configured to convert power to be supplied to the motor 20 from DC to AC during power running, and convert regenerative power of the motor 20 from AC to DC during regeneration.

The inverter device 10 includes voltage-drive SiC power semiconductor devices (for example, MOSFETs) 11, diodes 12 each connected in inverse-parallel to the power semiconductor device 11, a control circuit 13 configured to carry out switching-control of the power semiconductor devices 11, and an inverter smoothing capacitor 14 configured to remove ripples of a bus.

The DC/DC converter 40 has a function of converting a DC voltage V1 input between voltage terminals Vn and Vp1 to a DC voltage V2, which is stepped up approximately by twice to output the converted voltage V2 between voltage terminals Vn and Vp2, and a function of converting the DC voltage V2 input between the voltage terminals Vn and Vp2 to the DC voltage V1, which is stepped down approximately by half to output the converted voltage V1 between the voltage terminals Vn and Vp1.

The DC/DC converter 40 includes voltage-drive power semiconductor devices (for example, IGBTs or MOSFETs)

41 and 42, diode devices 44 and 45 connected in inverse-parallel to the power semiconductor devices 41 and 42, respectively, DC/DC converter smoothing capacitors 47 configured to smooth the voltage V1 input/output between the voltage terminals Vn and Vp1 and the voltage V2 input/output between the voltage terminals Vn and Vp2, an energy transfer capacitor 48a set to have a capacity value sufficiently smaller than that of the DC/DC converter smoothing capacitor 47 and an energy transfer reactor 48b, and a control circuit 49 configured to carry out switching-control of the power semiconductor devices 41 and 42 so that the voltage between the voltage terminals Vn and Vp2 reaches a voltage command value.

The voltage sensor 71 is configured to detect the voltage between the voltage terminals Vn and Vp1. The voltage sensor 72 is configured to detect the voltage between the voltage terminals Vn and Vp2. Moreover, the revolution number sensor 73 is configured to detect the number of revolutions of the motor 20.

The controller 60 includes a motor loss estimator 61 configured to estimate a loss of the motor 20, an inverter loss estimator 62 configured to estimate a loss of the inverter device 10, a DC/DC converter loss estimator 63 configured to estimate a loss of the DC/DC converter 40, and a voltage command value calculator 64 configured to calculate the voltage command value of the voltage to be output by the DC/DC converter 40 between the voltage terminals Vn and Vp2 based on the loss estimation results.

A description is now given of relationships between the voltage V2 between the voltage terminals Vn and Vp2 and the losses of the respective components including the motor 20, the inverter device 10, and the DC/DC converter 40. FIG. 2A to FIG. 2E are graphs for showing the relationships between the voltage V2 and the losses of the respective components in the motor control device for a vehicle according to the first embodiment of the present invention.

Figure 2A:
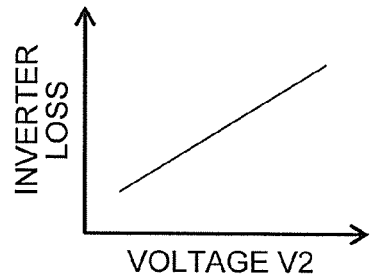
FIG. 2A is a graph for showing a relationship between an output voltage of a DC/DC converter and an inverter loss in the motor control device for a vehicle according to the first embodiment of the present invention.
Figure 2B:
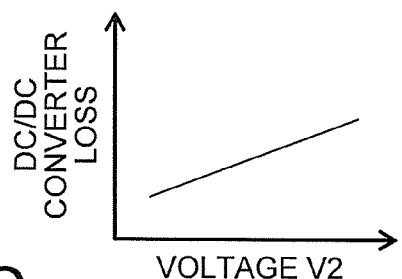
FIG. 2B is a graph for showing a relationship between the output voltage of the DC/DC converter and a DC/DC converter loss in the motor control device for a vehicle according to the first embodiment of the present invention.
Figure 2C:
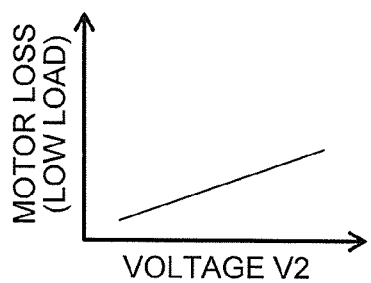
FIG. 2C is a graph for showing a relationship between the output voltage of the DC/DC converter and a motor loss at a low load in the motor control device for a vehicle according to the first embodiment of the present invention.
Figure 2D:
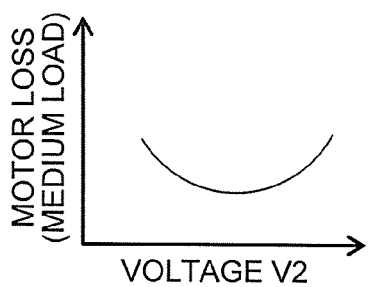
FIG. 2D is a graph for showing a relationship between the output voltage of the DC/DC converter and the motor loss at a medium load in the motor control device for a vehicle according to the first embodiment of the present invention.
Figure 2E:
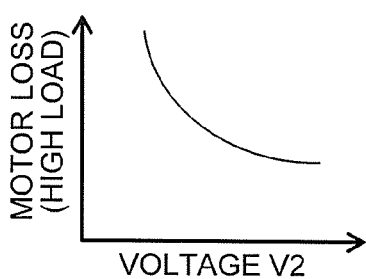
FIG. 2E is a graph for showing a relationship between the output voltage of the DC/DC converter and the motor loss at a high load in the motor control device for a vehicle according to the first embodiment of the present invention.

Specifically, FIG. 2A is a graph for showing the relationship between the voltage V2 and the inverter loss, FIG. 2B is a graph for showing the relationship between the voltage V2 and the DC/DC converter loss, and FIG. 2C to FIG. 2E are graphs for showing the relationships between the voltage V2 and the motor loss in three individual patterns at a low load, a medium load, and a high load, respectively.

The inverter loss and the DC/DC converter loss tend to increase as the voltage V2 increases (refer to FIG. 2A and FIG. 2B). This is because losses generated when the power semiconductor devices 11 of the inverter device 10 and the power semiconductor devices 41 and 42 of the DC/DC converter 40 are switched increase as the voltage V2 increases.

Meanwhile, regarding the motor loss, a loss characteristic changes depending on an operating point (number of revolutions and torque) of the motor 20. When the motor 20 is at the low load (low number of revolutions and low torque), the motor loss tends to increase as the voltage V2 increases (refer to FIG. 2C). This is because an iron loss generated by a change in magnetic flux in an iron core part of the motor 20 increases as the voltage V2 increases.

In contrast, when the motor 20 is at the medium to high load (medium to high number of revolutions and medium to high torque), the motor loss has such a characteristic as being the minimum at a voltage higher than that at the low load (refer to FIG. 2D and FIG. 2E). This is because, when the motor is at the medium to high load, and the voltage V2 is low, a motor current caused to flow to cancel an induced voltage at the high load on the motor increases, and the loss depending on this current thus increases. As can be found from a comparison among FIG. 2C to FIG. 2E, the increase in the loss of the motor 20 becomes significant as the load on the motor 20 increases.

Figure 3A:
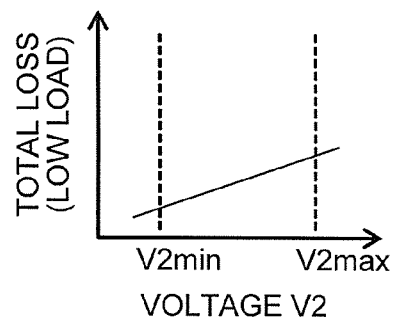
FIG. 3A is a graph for showing a relationship between an output voltage of a DC/DC converter and a total loss at the low load in a related-art method.
Figure 3B:
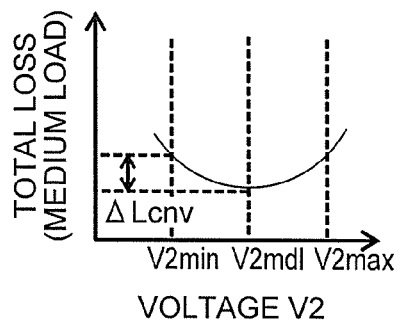
FIG. 3B is a graph for showing a relationship between the output voltage of the DC/DC converter and the total loss at the medium load in the related-art method.
Figure 3C:
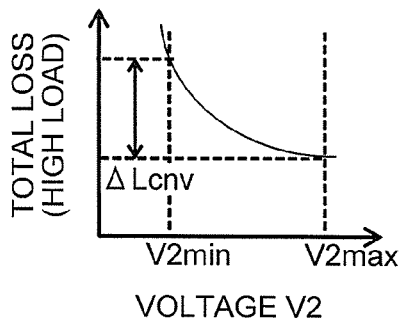
FIG. 3C is a graph for showing a relationship between the output voltage of the DC/DC converter and the total loss at the high load in the related-art method.

FIG. 3A to FIG. 3C are graphs for showing relationships between the voltage V2 and a total loss, which is a sum of the losses of the respective components, in a related-art method. More specifically, in FIG. 3A to FIG. 3C, the relationships between the voltage V2 and the total loss are shown in the three individual patterns at the low load, the medium load, and the high load.

The voltage terminals Vn-Vp2 of the motor control device for a vehicle are controlled so as to be a voltage of between V2min to V2max. V2min is the minimum voltage value applied between the voltage terminals Vn and Vp2, and is equivalent to, for example, the voltage of the electricity storage device 30. Meanwhile, V2max is the maximum voltage applied between the voltage terminals Vn and Vp2, and is, for example, the maximum voltage that can be output from the DC/DC converter 40.

When the motor is at the low load, the total loss is the minimum when the voltage V2 is V2min (refer to FIG. 3A). When the motor is at the medium load, the total loss is the minimum when the voltage V2 is V2mid, which is a voltage value between V2min and V2max (refer to FIG. 3B).

When the motor is at the high load, the total loss is the minimum when the voltage V2 is V2max (refer to FIG. 3C). In order to improve fuel efficiency/electricity efficiency during the vehicle travel, it is only required to control the output voltage of the DC/DC converter 40 so that the total loss is minimized.

In the control range of the voltage terminals Vn and Vp2 of the motor control device for a vehicle in the respective load states, a loss difference between a total loss L_V2min for a voltage V2min, at which the DC/DC converter 40 does not carry out the step-up operation, and a total loss L_V2L obtained when the total loss is the minimum is indicated as ΔLcnv.

As shown in FIG. 3, in the case of the related-art method, ΔLcnv is a large value compared with a loss difference ΔLng in the present invention, which is described later with reference to FIG. 4. The reason for this is that, in the related-art method, loss increase amounts of the inverter device 10 and the DC/DC converter 40 are large with respect to the increase in the voltage V2.

An increase in the loss difference ΔLcnv means that the fuel efficiency/electricity efficiency during the vehicle travel can be improved through the variable control of the voltage V2. Conversely, the losses of the inverter device 10 and the DC/DC converter 40 are required to be decreased in order to improve the fuel efficiency/electricity efficiency during the vehicle travel, and, for that purpose, the voltage V2 are required to be finely controlled to be an optimal voltage so that the total loss is minimized.

In the first embodiment, SiC devices are applied to the power semiconductor devices 11 of the inverter device 10. The SiC device has such a characteristic as being lower in the power loss than a Si device, which has hitherto been used as the power semiconductor device of the vehicle inverter. In terms of this characteristic, relationships between the voltage V2 and the total loss are shown in FIG. 4.

Figure 4A:
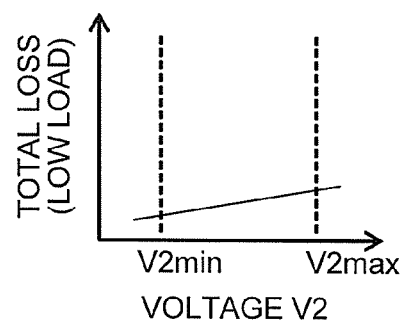
FIG. 4A is a graph for showing a relationship between the output voltage of the DC/DC converter and a total loss at the low load in the motor control device for a vehicle according to the first embodiment of the present invention.
Figure 4B:
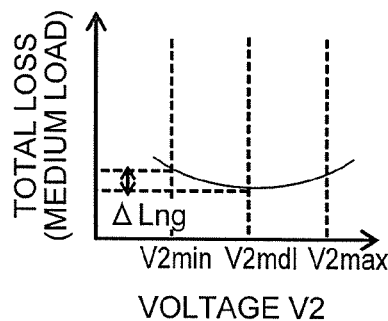
FIG. 4B is a graph for showing a relationship between the output voltage of the DC/DC converter and the total loss at the medium load in the motor control device for a vehicle according to the first embodiment of the present invention.
Figure 4C:
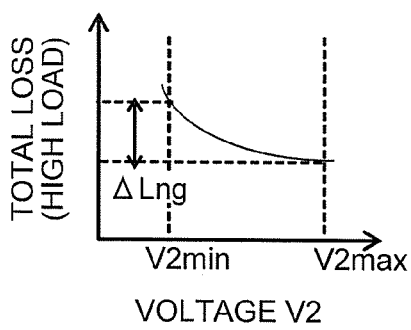
FIG. 4C is a graph for showing a relationship between the output voltage of the DC/DC converter and the total loss at the high load in the motor control device for a vehicle according to the first embodiment of the present invention.

FIG. 4A to FIG. 4C are graphs for showing the relationships between the voltage V2 and the total loss, which is the sum of the losses of the respective components, in the motor control device for a vehicle according to the first embodiment of the present invention. More specifically, in FIG. 4A to FIG. 4C, the relationships between the voltage V2 and the total loss obtained when the SiC devices are applied to the power semiconductor devices 11 of the inverter device 10 are shown in the three individual patterns at the low load, the medium load, and the high load.

Similarly to FIG. 3, V2min in FIG. 4 is the minimum voltage value applied between the voltage terminals Vn and Vp2, and is equivalent to, for example, the voltage of the electricity storage device 30. Further, V2max in FIG. 4 is the maximum voltage applied between the voltage terminals Vn and Vp2, and is, for example, the maximum voltage that can be output from the DC/DC converter 40.

In the control range of the voltage terminals Vn and Vp2 of the motor control device for a vehicle in the respective load states, a loss difference between a total loss L_V2min for a voltage V2min, at which the DC/DC converter 40 does not carry out the step-up operation, and a total loss L_V2L obtained when the total loss is the minimum is indicated as ΔLng.

As apparent from a comparison between FIG. 3 and FIG. 4, the loss difference ΔLng in the first embodiment is smaller than the loss difference ΔLcnv in the related-art method. The reason for this is that, in the first embodiment, as a result of the application of SiC to the power semiconductor devices 11, the inverter loss decreases, and the loss increase amount of the inverter device 10 with respect to the increase in the voltage V2 is thus small.

The relationship of ΔLng<ΔLcnv means that the effect of improvement of the fuel efficiency/electricity efficiency during the vehicle travel through the variable control of the voltage V2 may become smaller than that of the related-art method. In other words, when SiC is applied to the power semiconductor devices 11 of the inverter device 10, the fuel efficiency/electricity efficiency during the vehicle travel can be improved even without finely controlling the voltage V2.

In consideration of such an effect of improvement, in the first embodiment of the present invention, as illustrated in FIG. 1, the DC/DC converter 40 of the step-up type, which uses capacitor charge/discharge through LC resonance, and provides a stepwise output voltage, is employed. A step-up ratio of such a DC/DC converter 40 is limited to integer multiples. However, such a DC/DC converter 40 can be downsized and decreased in the loss compared with a DC/DC converter that can finely change the step-up ratio.

Specifically, for example, compared with a related-art chopper type, the DC/DC converter 40 in the first embodiment employs the step-up type providing the stepwise output voltage to eliminate a large reactor, to thereby enable the downsizing of the motor control device for a vehicle and the decrease in loss.

In addition, the motor control device for a vehicle according to the first embodiment can achieve a low loss through use of the step-up type, and hence, even when a related-art Si-IGBT is used for the power semiconductor devices 11 of the inverter device 10, high efficiency is achieved. Therefore, with this type, high efficiency, downsizing, and reduction in cost can be achieved. Moreover, the loss of the DC/DC converter 40 is decreased, and hence ΔLng further decreases, with the result that necessity for the fine control of the voltage V2 for improving the fuel efficiency/electricity efficiency during the vehicle travel is further eliminated.

Meanwhile, in order to secure desired output during the vehicle travel, a voltage higher than the induced voltage of the motor 20 is required to be applied as the voltage V2 in the high revolution range of the motor 20. For a motor control device for a vehicle in which the voltage of the electricity storage device 30 is lower than the induced voltage of the motor 20, the DC/DC converter 40 configured to step up the voltage of the electricity storage device 30 to output the stepped-up voltage between the voltage terminals Vn and Vp2 is indispensable.

Thus, with the configuration and the control method in the first embodiment of the present invention, sufficient output can be secured during the vehicle travel, and in addition, the improvement in the fuel efficiency/electricity efficiency and the downsizing of the motor control device for a vehicle can be achieved.

Figure 5:
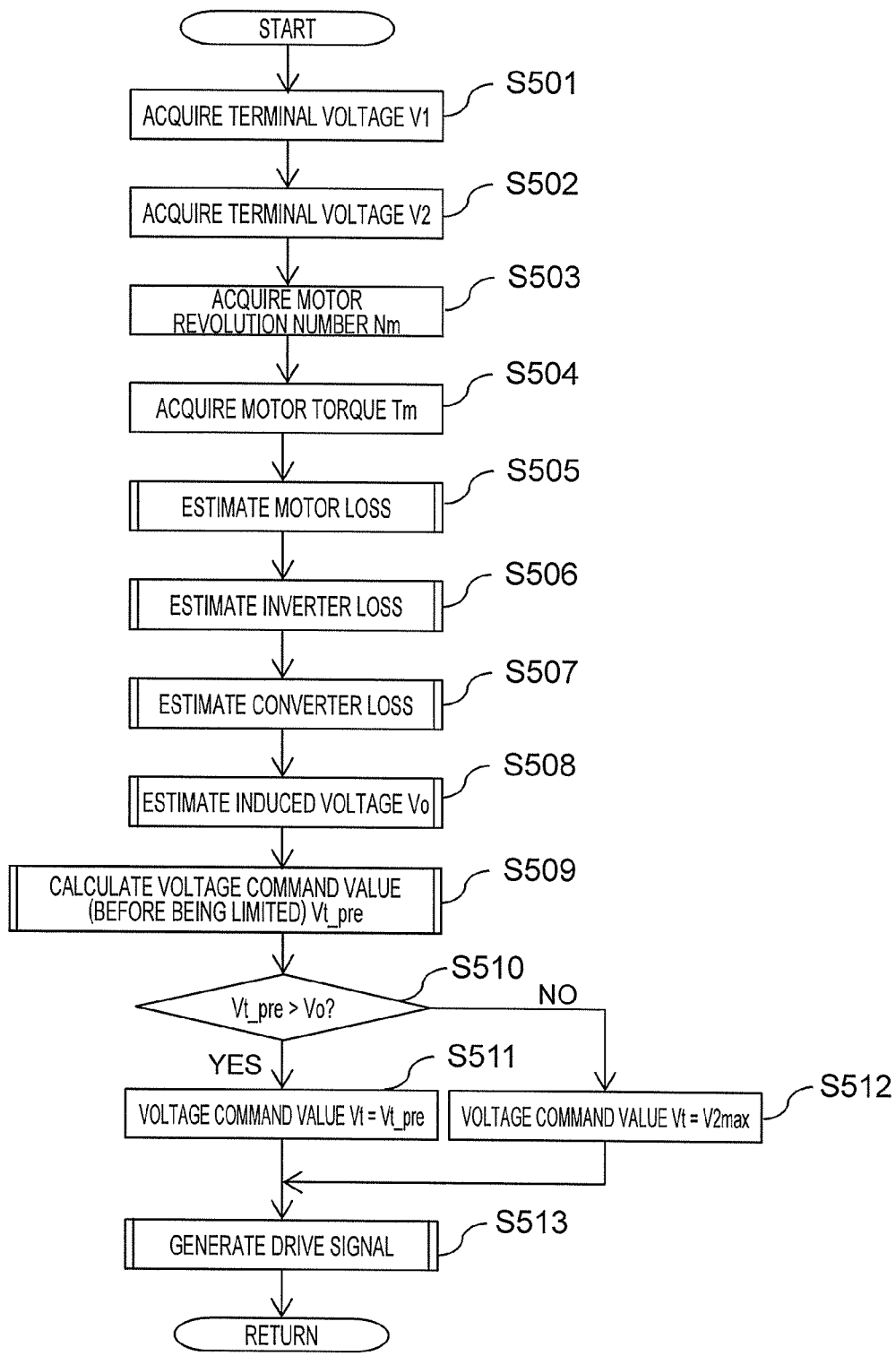
FIG. 5 is a flowchart for illustrating a series of operations relating to processing of variably switching an output voltage of the DC/DC converter, which is carried out in a controller of the motor control device for a vehicle according to the first embodiment of the present invention.

Referring to a flowchart, a description is now given of processing of variably switching the output voltage of the DC/DC converter 40 of the motor control device for a vehicle according to the first embodiment. FIG. 5 is a flowchart for illustrating a series of operations relating to the processing of variably switching the output voltage of the DC/DC converter 40, which is carried out in the controller 60 of the motor control device for a vehicle according to the first embodiment of the present invention.

In Step S501, the controller 60 acquires a terminal voltage V1 on the electricity storage device side of the DC/DC converter 40, which is detected by the voltage sensor 71.

Then, in Step S502, the controller 60 acquires a terminal voltage V2 on the inverter device side of the DC/DC converter 40, which is detected by the voltage sensor 72.

Then, in Step S503, the controller 60 acquires a motor revolution number Nm detected by the revolution number sensor 73.

Then, in Step S504, the controller 60 acquires a motor torque Tm detected by, for example, a torque sensor (not shown). As the motor torque Tm, a motor torque command value received from a control unit (not shown) provided at a higher level may be employed.

In Steps S505, S506, and S507, the controller 60 estimates the motor loss, the inverter loss, and the DC/DC converter loss, respectively, with respect to the voltage V2 in a current load state, based on at least one of the terminal voltage V1, the terminal voltage V2, the motor revolution number Nm, and the motor torque Tm, which are acquired in Steps S501 to S504.

Specifically, processing of Step S505 is carried out by the motor loss estimator 61, processing of Step S506 is carried out by the inverter loss estimator 62, and processing of Step S507 is carried out by the converter loss estimator 63.

Moreover, as estimation methods for the respective losses, for example, there may be employed a method of estimating the losses with use of maps set in advance for the respective inputs, or a method of estimating the losses from currents and voltages of respective components of the motor control device for a vehicle and the like based on loss theoretical formulae for the respective devices.

Then, in Step S508, the controller 60 estimates an induced voltage Vo of the motor 20 based on the motor revolution number Nm acquired in Step S503. In the motor 20, as the motor revolution number Nm and the motor torque Tm increase, a counter-electromotive force increases, and the induced voltage Vo of the motor thus increases. Thus, the controller 60 estimates the induced voltage Vo of the motor based on this characteristic.

Then, in Step S509, the controller 60 derives the voltage V2 that minimizes the total loss, which is the sum of the respective losses estimated in Steps S505, S506, and S507, and outputs the voltage V2 as a voltage command value Vt_pre before being limited. Vt_pre in the first embodiment is any one of V2min and V2max.

Then, in Step S510, the controller 60 compares the induced voltage Vo of the motor, which is obtained in Step S508, and the voltage command value Vt_pre before being limited, which is obtained in Step S509, with each other.

Then, based on the comparison result obtained in Step S510, the controller 60 proceeds to Step S511 when Vt_pre>Vo, and proceeds to Step S512 when Vt_pre≤Vo.

When the controller 60 proceeds to Step S511, the controller 60 sets a voltage command value Vt to Vt_pre, and proceeds to Step S513. On the other hand, when the controller 60 proceeds to Step S512, the controller 60 sets the voltage command value Vt to V2max, and proceeds to Step S513.

Finally, in Step S513, the controller 60 outputs a drive signal of causing the voltage V2 to reach the voltage command value Vt to the control circuit 49 included in the DC/DC converter 40 configured to carry out switching-control of the power semiconductor devices 41 and 42. The processing of Step S508 to Step S513 is carried out by the voltage command value calculator 64 included in the controller 60.

As described above, the motor control device for a vehicle and the motor control method for a vehicle according to the first embodiment have the following features.

(Feature 1) SiC, which is smaller in the change of loss depending on the voltage than the related-art Si device, is applied to the power semiconductor devices of the inverter configured to drive the motor.

(Feature 2) The output voltage is set to the voltage that minimizes the total loss by the step-up DC/DC converter of the circuit type configured to step up the voltage of the DC power supply, for example, a battery, to an integer multiple thereof.

As a result, it is possible to provide the motor control device for a vehicle and the motor control method for a vehicle, which are capable of achieving both the improvement in the fuel efficiency/electricity efficiency and the downsizing of the motor control device for a vehicle without a loss in the vehicle output.

In the first embodiment described above, the diode 12 is connected in inverse-parallel to the power semiconductor device 11, but this diode may be a parasitic diode of the power semiconductor device 11. This configuration enables further downsizing of the motor control device for a vehicle.

Second Embodiment

Figure 6:
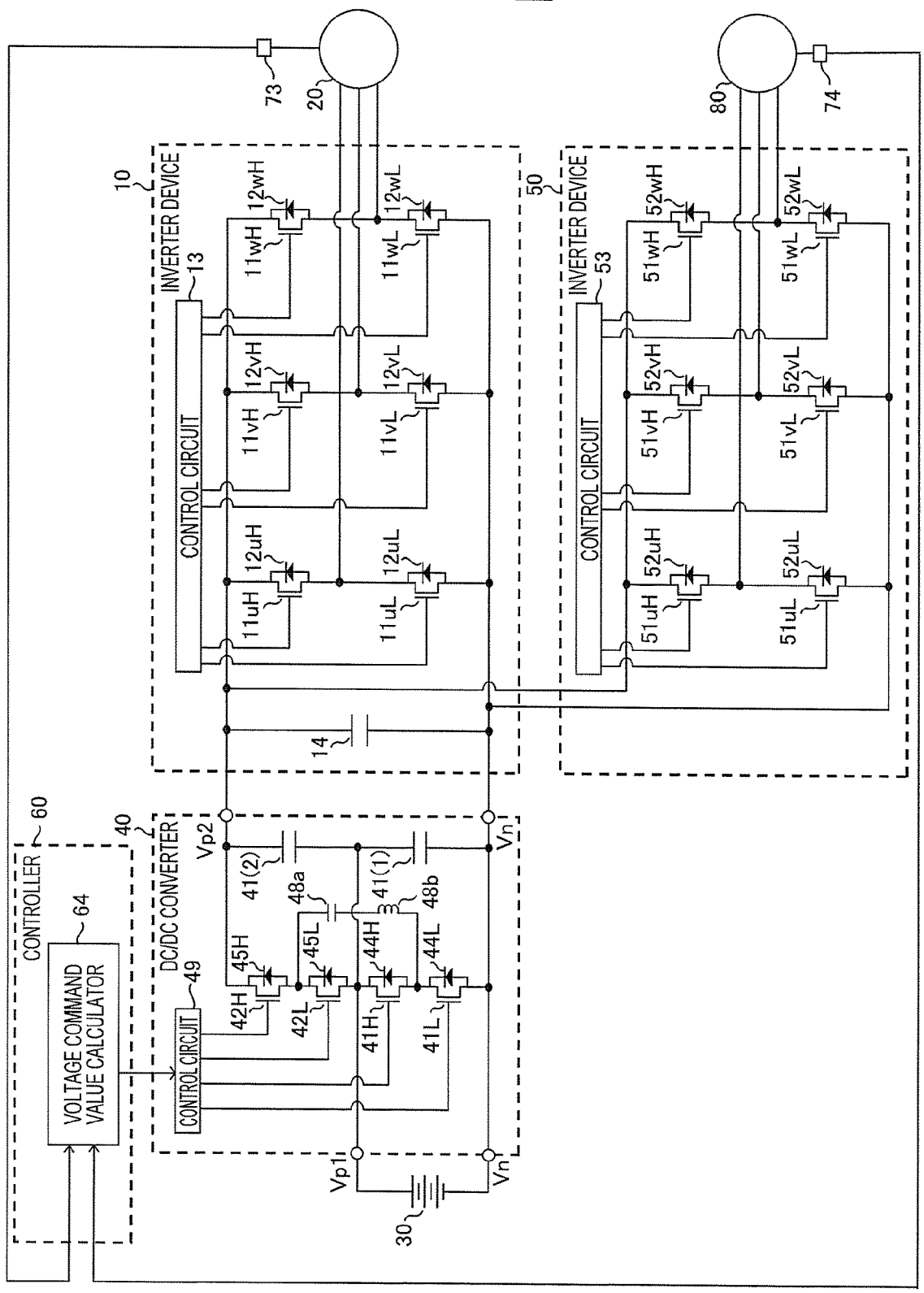
FIG. 6 is a configuration diagram of the motor control device for a vehicle according to a second embodiment of the present invention.

FIG. 6 is a configuration diagram of a motor control device for a vehicle according to a second embodiment of the present invention. The motor control device for a vehicle according to the second embodiment includes an inverter device 10, a power-running/regeneration motor 20, an electricity storage device 30, a DC/DC converter 40, a generator-motor inverter device 50, a controller 60, revolution number sensors 73 and 74, and a generator motor 80.

The motor control device for a vehicle according to the second embodiment illustrated in FIG. 6 is different from the motor control device for a vehicle according to the first embodiment illustrated in FIG. 1 in that the generator-motor inverter device 50, the revolution number sensor 74, and the generator motor 80 are further included. Thus, a description is now given mainly of such differences.

In FIG. 6, for the sake of simple illustration, the motor loss estimator 61, the inverter loss estimator 62, and the DC/DC converter loss estimator 63 included in the controller 60, and the voltage sensors 71 and 72 are not shown.

The generator-motor inverter device 50 is configured to convert power supplied to the generator motor 80 from DC to AC during the power running, and convert regenerative power of the generator motor 80 from AC to DC during the regeneration.

The generator-motor inverter device 50 includes SiC power semiconductor devices (for example, MOSFETs) 51 of the voltage drive type, diodes 52 each connected in inverse-parallel to the power semiconductor device 51, and a control circuit 53 configured to carry out switching-control of the power semiconductor devices 51.

The generator motor 80 is mainly used to generate electricity to charge the electricity storage device 30. Moreover, the revolution number sensor 74 is configured to detect the number of revolutions of the generator motor 80.

Figure 7:
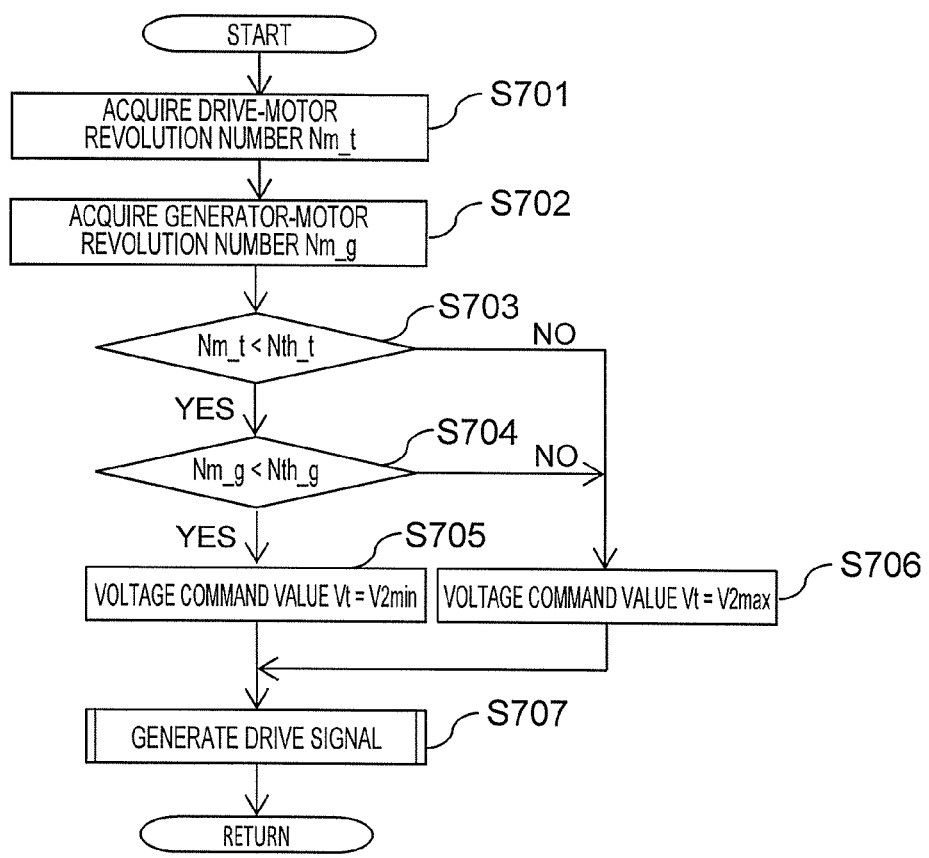
FIG. 7 is a flowchart for illustrating a series of operations relating to processing of variably switching an output voltage of the DC/DC converter, which is carried out in a controller of the motor control device for a vehicle according to the second embodiment of the present invention.

Referring to a flowchart, a description is now given of processing of variably switching the output voltage of the DC/DC converter 40 of the motor control device for a vehicle according to the second embodiment. FIG. 7 is a flowchart for illustrating a series of operations relating to the processing of variably switching the output voltage of the DC/DC converter 40, which is carried out in the controller 60 of the motor control device for a vehicle according to the second embodiment of the present invention.

In Step S701, the controller 60 acquires a number of revolutions Nm_t of the drive motor 20, which is detected by the revolution number sensor 73.

Then, in Step S702, the controller 60 acquires a number of revolutions Nm_g of the generator motor 80, which is detected by the revolution number sensor 74.

Then, in Step S703, the controller 60 compares the number of revolutions Nm_t of the drive motor acquired in Step S701 and a threshold value Nth_t set in advance with each other. Then, based on a comparison result obtained in Step S703, the controller 60 proceeds to Step S704 when the number of revolutions Nm_t of the drive motor is less than the threshold value Nth_t, and proceeds to Step S706 otherwise. On this occasion, the threshold value Nth_t is set in advance to a value less than an induced voltage of the drive motor 20.

When the controller 60 proceeds to Step S704, the controller 60 compares the number of revolutions Nm_g of the generator motor 80 acquired in Step S702 and a threshold value Nth_g set in advance with each other. Then, based on a comparison result obtained in Step S704, the controller 60 proceeds to Step S705 when the number of revolutions Nm_g of the generator motor is less than the threshold value Nth_g, and proceeds to Step S706 otherwise. On this occasion, the threshold value Nth_g is set in advance to a value less than an induced voltage of the generator motor 80.

When the controller 60 proceeds to Step S705, the controller 60 sets the voltage command value Vt to V2min, and proceeds to Step S707. On the other hand, when the controller 60 proceeds to Step S706, the controller 60 sets the voltage command value Vt to V2max, and proceeds to Step S707.

Finally, in Step S707, the controller 60 outputs a drive signal of causing the voltage V2 to reach the voltage command value Vt to the control circuit 49 included in the DC/DC converter 40 configured to carry out switching-control of the power semiconductor devices 41 and 42. The processing of Step S701 to Step S707 is carried out by the voltage command value calculator 64 included in the controller 60.

As described above, the motor control device for a vehicle and the motor control method for a vehicle according to the second embodiment have the following features.

(Feature 1) SiC, which is smaller in the change of loss depending on the voltage than the related-art Si device, is applied to the power semiconductor devices of the inverter configured to drive the motor.

(Feature 2) The output voltage is set in accordance with the number of revolutions of the drive motor or the number of revolutions of the generator motor by the step-up DC/DC converter of the circuit type configured to step up the voltage of the DC power supply, for example, a battery, to an integer multiple thereof.

As a result, it is possible to provide the motor control device for a vehicle and the motor control method for a vehicle, which are capable of achieving both the improvement in the fuel efficiency/electricity efficiency and the downsizing of the motor control device for a vehicle without a loss in the vehicle output.

In the above-mentioned second embodiment, the number of revolutions of the drive motor 20 or the number of revolutions of the generator motor 80 is used as a parameter for variably switching the voltage V2, but the parameter is not limited to the number of revolutions. As the parameter for variably switching the voltage V2, a drive-motor torque, a generator-motor torque, or the acceleration or speed of the vehicle may be employed, and the same effect can be provided even in this case.

Moreover, in the second embodiment, the SiC devices are applied to the power semiconductor devices 51 and the diodes 52, but the SiC devices may be Si devices. The reason for this is that the inverter device 10 for the drive motor 20 is higher in operation frequency during the vehicle travel than the inverter device 50 for the generator motor 80. As a result, reduction in the cost of the vehicle as well as the improvement in the fuel efficiency/electricity efficiency of the vehicle and the downsizing of the motor control device for a vehicle can be achieved by employing the configuration in which the SiC devices are used only for necessary parts.

Further, in the first and second embodiments described above, a description is given of the case in which the DC/DC converter having the fixed step-up ratio of 2 is used. However, as the DC/DC converter used for the present invention, a DC/DC converter having a multi-stage configuration capable of providing a step-up ratio of 2 or more may be employed.

Figure 8:
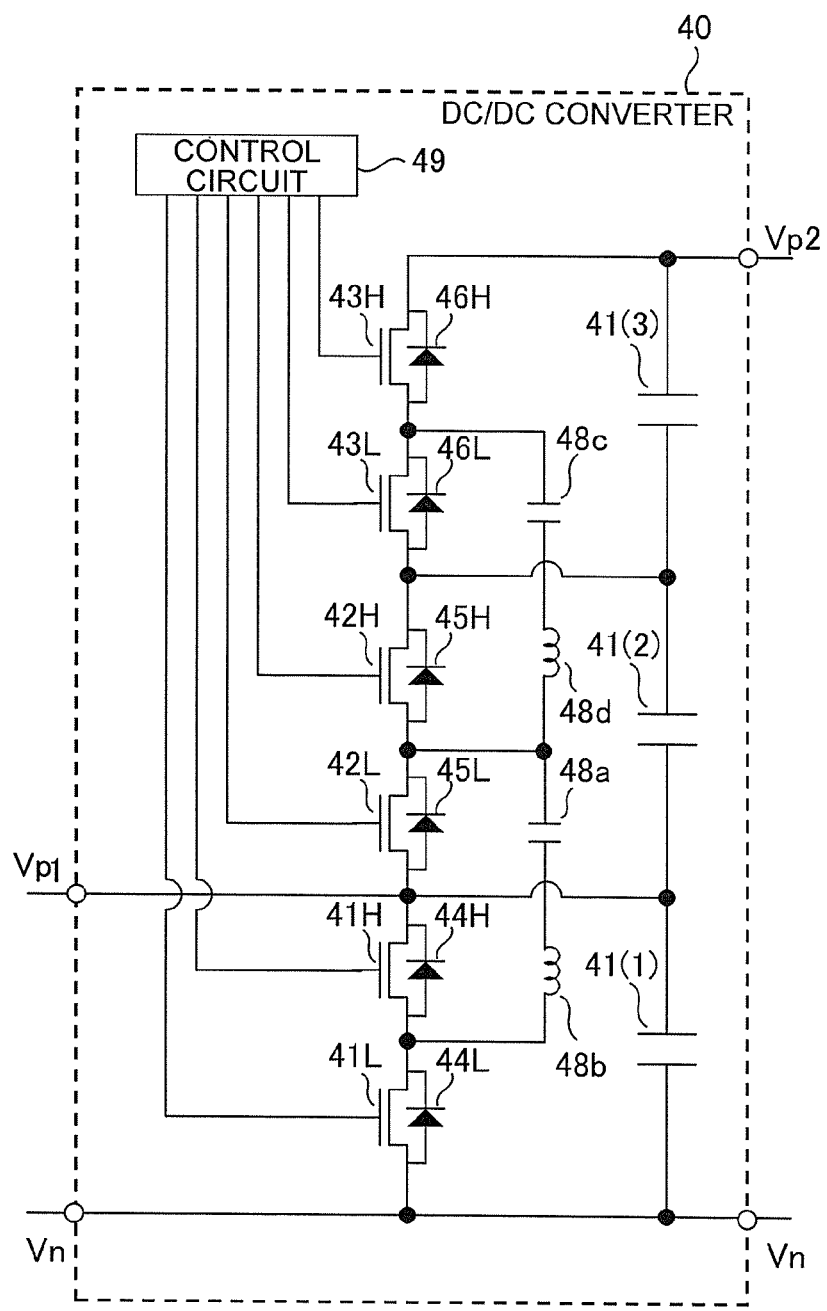
FIG. 8 is a configuration diagram of a DC/DC converter having a multi-stage configuration, which is applicable to the motor control devices for a vehicle according to the first and second embodiments of the present invention.

FIG. 8 is a configuration diagram of a DC/DC converter having a multi-stage configuration, which is applicable to the motor control devices for a vehicle according to the first and second embodiments. Further improvement in the fuel efficiency/electricity efficiency of the vehicle can be achieved by the DC/DC converter having the multi-stage configuration as illustrated in FIG. 8.

Moreover, in the first and second embodiments, a description is given of the case in which the power semiconductor devices, which are the switching devices, are formed of silicon carbide (SiC), which is a type of a wideband gap semiconductor. However, in the present invention, wide bandgap semiconductor other than SiC is also applicable to the power semiconductor devices. Examples of the applicable wide bandgap semiconductor devices include a gallium nitride-based material and diamond in addition to silicon carbide.

The power semiconductor device formed of such wide bandgap semiconductor is high in a withstand voltage and a permissible current density. Therefore, the power semiconductor device can be downsized. Further, through use of the downsized power semiconductor devices, the inverter device and the DC/DC converter into which those devices are built can also be downsized.

Moreover, the power semiconductor device is also high in heat resistance, and hence heat radiation fins of a heat sink can be downsized, and a water-cooling part can be replaced by an air-cooling part. Therefore, the inverter device and the DC/DC converter can be further downsized.

Further, the power loss of the power semiconductor device is low, and hence efficiency of the power semiconductor devices can be increased. Consequently, efficiency of the inverter device and the DC/DC converter can be increased.

In addition to the power semiconductor devices, the diodes each connected in inverse-parallel to the power semiconductor device are preferably formed of wide bandgap semiconductors. With this configuration, further downsizing and a further increase in the efficiency can be achieved.

The invention claimed is:

1. A motor control device for a vehicle, the motor control device comprising:
  an inverter, in which first power semiconductor devices are installed, and which is configured to drive a motor through switching-control of the first power semiconductor devices, at least a part of the first power semiconductor devices formed of a wide bandgap semiconductor;
  a DC/DC converter, which is configured to carry out a DC/DC power conversion of stepping up an input voltage, which is a DC voltage, in accordance with a voltage command value, to thereby provide an output voltage to be applied to the inverter, the DC/DC converter having a circuit configuration in which a plurality of voltage values is generated as a stepwise output value obtained by stepping up the input voltage to an integer multiple of the input voltage, the plurality of voltage values comprising a first voltage value and a second voltage value that is the integer multiple of the first voltage value;
  an induced voltage estimator configured to estimate an induced voltage of the motor in an operation state of the motor based on a number of revolutions of the motor and a torque of the motor; and
  a controller configured to:
    calculate a total loss based on a motor loss, an inverter loss, and a DC/DC converter loss,
    identify a voltage value among the first voltage value and the second voltage value that minimizes the total loss,
    based on the identified voltage value being greater than the induced voltage of the motor, control the DC/DC converter to provide the identified voltage value among the first voltage value and the second voltage value, and
    based on the identified voltage value being less than or equal to the induced voltage of the motor, control the DC/DC converter to provide the output voltage value equal to the second voltage value,
  wherein the DC/DC converter comprises:
    basic circuits connected in series to each other, each of the basic circuits including two second power semiconductor devices controlled by switching-control, an intermediate terminal disposed between the two second power semiconductor devices, and a smoothing capacitor connected in parallel to the two second power semiconductor devices,
    a series circuit including an energy transfer capacitor and an energy transfer reactor, one end of the series circuit being connected to the intermediate terminal between the two second power semiconductor devices of a first basic circuit among the basic circuits and other end of the series circuit being connected to the intermediate terminal between the two second power semiconductor devices of a second basic circuit among the basic circuits, and a connection point disposed between the first basic circuit and the second basic circuit and connected to a connection point disposed between the smoothing capacitor of the first basic circuit and the smoothing capacitor of the second basic circuit.

2. The motor control device for the vehicle according to claim 1, wherein the first basic circuit is adjacent to the second basic circuit, and the DC/DC converter is further configured to carry out the DC/DC power conversion through charging and discharging of the energy transfer capacitor.

3. The motor control device for the vehicle according to claim 2, wherein each of the two second power semiconductor devices installed in each of the basic circuits of the DC/DC converter is formed of a wide bandgap semiconductor.

4. The motor control device for the vehicle according to claim 1, wherein:

the motor includes a drive motor to be used to drive the vehicle and a generator motor connected to a power source and to be used to charge a DC power supply;

the inverter includes a drive-motor inverter configured to drive the drive motor and a generator-motor inverter configured to drive the generator motor; and the drive-motor inverter and the generator-motor inverter are connected in parallel to each other on a DC side of each of the drive-motor inverter and the generator-motor inverter.

5. The motor control device for the vehicle according to claim 4, wherein:

the drive-motor inverter comprises the at least the part of the first power semiconductor devices formed of the wide bandgap semiconductor; and the generator-motor inverter comprises other part of the first power semiconductor devices formed of devices other than the wide bandgap semiconductor.

6. The motor control device for the vehicle according to claim 1, further comprising:

a voltage sensor configured to measure each of the input voltage and the output voltage, wherein the controller is further configured to read, as input information, the input voltage and the output voltage, which are detected by the voltage sensor, and a torque command value to calculate the plurality of voltage vales to be output as the stepwise output value, based on the input information.

7. The motor control device for the vehicle according to claim 6, wherein the controller includes:

a motor loss estimator configured to estimate a first loss, as the motor loss, for each of the first voltage value and the second voltage value;

an inverter loss estimator configured to estimate a second loss, as the inverter loss, for each of the first voltage value and the second voltage value; and a DC/DC converter loss estimator configured to estimate a third loss, as the DC/DC converter loss, for each of the first voltage value and the second voltage value, wherein the controller is further configured to calculate the total loss as a sum of the first loss, the second loss, and the third loss for each of the first voltage value and the second voltage value.

8. The motor control device for the vehicle according to claim 6, further comprising a revolution number detector configured to detect the number of revolutions of the motor, wherein the controller is further configured to control the DC/DC converter to provide the output voltage value equal to the second voltage value based on the number of revolutions exceeding a threshold value.

9. The motor control device for the vehicle according to claim 6, further comprising a torque detector configured to detect the torque of the motor, wherein the controller is further configured to control the DC/DC converter to provide the output voltage value equal to the second voltage value based on the torque exceeding a threshold value.

10. The motor control device for the vehicle according to claim 6, further comprising a vehicle speed detector configured to detect a speed of the vehicle, wherein the controller is further configured to control the DC/DC converter to provide the output voltage value equal to the second voltage value based on the speed of the vehicle exceeding a threshold value.

11. The motor control device for the vehicle according to claim 6, further comprising an acceleration detector configured to detect an acceleration of the vehicle, wherein the controller is further configured to control the DC/DC converter to provide the output voltage value equal to the second voltage value based on the acceleration exceeding a threshold value.

12. A motor control method for a vehicle, which is carried out in a motor control device for the vehicle, the motor control device including:

an inverter, in which a plurality of power semiconductor devices are installed, and which is configured to drive a motor through switching-control of the plurality of power semiconductor devices;

a DC/DC converter, which has a circuit configuration in which a DC/DC power conversion of stepping up an input voltage, which is a DC voltage, in accordance with a voltage command value is carried out, to thereby generate an output voltage to be applied to the inverter as a stepwise output value, wherein the DC/DC converter comprises:

basic circuits connected in series to each other, each of the basic circuits including two second power semiconductor devices controlled by switching-control, an intermediate terminal disposed between the two second power semiconductor devices, and a smoothing capacitor connected in parallel to the two second power semiconductor devices, a series circuit including an energy transfer capacitor and an energy transfer reactor, one end of the series circuit being connected to the intermediate terminal between the two second power semiconductor devices of a first basic circuit among the basic circuits and other end of the series circuit being connected to the intermediate terminal between the two second power semiconductor devices of a second basic circuit among the basic circuits, and a connection point disposed between the first basic circuit and the second basic circuit and connected to a connection point disposed between the smoothing capacitor of the first basic circuit and the smoothing capacitor of the second basic circuit;

an induced voltage estimator configured to estimate an induced voltage of the motor in an operation state of the motor;

a voltage sensor, which is configured to measure each of the input voltage and the output voltage; and a controller configured to read as input information the input voltage and the output voltage, which are detected by the voltage sensor, and a torque command value to calculate the voltage command value based on the input information, wherein the motor control method comprises:

generating a plurality of voltage values based on the input information so that the output voltage is generated by the DC/DC converter as the stepwise output value obtained by stepping up the input voltage to an integer multiple of the input voltage, the plurality of voltage values comprising a first voltage value and a second voltage value that is the integer multiple of the first voltage value;

estimating a first loss of the motor for each of the first voltage value and the second voltage value;

estimating a second loss of the inverter for each of the first voltage value and the second voltage value;

estimating a third loss of the DC/DC converter for each of the first voltage value and the second voltage value;

calculating a total loss as a sum of the first loss, the second loss, and the third loss for each of the first voltage value and the second voltage value;

identifying a voltage value among the first voltage value and the second voltage value that minimizes the total loss;

based on the identified voltage value being greater than the induced voltage of the motor, controlling the DC/DC converter to provide the identified voltage value; and based on the identified voltage value being less than the induced voltage of the motor, controlling the DC/DC converter to provide the output voltage value equal to the second voltage value.

* * * * *